United States Patent [19]
Kohn et al.

[11] Patent Number: 5,435,342
[45] Date of Patent: Jul. 25, 1995

[54] FLUID OUTLET SYSTEM

[75] Inventors: Gabriel S. Kohn; Eldon P. Rosentrater; Gregory A. Svolopoulos, all of St. Louis County

[73] Assignee: Allied Healthcare Products, Inc., St. Louis, Mo.

[21] Appl. No.: 175,670

[22] Filed: Dec. 30, 1993

Related U.S. Application Data

[63] Continuation of Ser. No. 38,314, Mar. 29, 1993, abandoned, which is a continuation of Ser. No. 828,144, Jan. 30, 1992, Pat. No. 5,197,511.

[51] Int. Cl.6 .................................................. F16L 5/00
[52] U.S. Cl. ...................................... 137/360; 137/315; 137/551
[58] Field of Search ............... 137/360, 315, 551, 343, 137/269; 251/149.6

[56] References Cited

U.S. PATENT DOCUMENTS 3,170,667  2/1965  Szohatzky ........................... 137/360
3,544,257  12/1970  Carnage ............................. 137/360

*Primary Examiner*—A. Michael Chambers
*Attorney, Agent, or Firm*—Dickstein, Shapiro & Morin

[57] ABSTRACT

A fluid outlet system is provided for selectively providing a plurality of fluids (e.g., oxygen, medical air and vacuum) at different locations. The fluids are provided by a multifluid distribution system, and the fluids are selected by positioning an active fascia assembly at a desired location along the length of the distribution system. Access to other sections of the distribution system is inhibited by blank fascia assemblies. The active and blank fascia assemblies can be repositioned as desired to change the types of fluids supplied to medical apparatuses and the like, and to change the locations at which such fluids are accessed.

1 Claim, 3 Drawing Sheets

FLUID OUTLET SYSTEM

This application is a continuation of application Ser. No. 08/038,314 filed Mar. 29, 1993, now abandoned, which is a continuation of application Ser. No. 07/828,144 filed Jan. 30, 1992, now U.S. Pat. No. 5,197,511.

BACKGROUND OF THE INVENTION

The present invention relates to a fluid outlet system for use in situations requiring ease of modification to meet changing needs, both in terms of the types of fluids supplied and the locations at which such fluids are supplied. More particularly, the present invention relates to a system for providing medical fluids, such as oxygen, medical air and vacuum, in hospital settings where it is often desirable to change the types of fluids supplied and the locations at which such fluids are supplied.

Attempts have been made to provide fluid outlet systems with the requisite adaptability necessary for modern hospital administration. These attempts are described in a number of issued patents including the following:

U.S. Pat. No. 4,905,433 discloses a hospital headwall system having raceways divided into compartments some of which can be used for carrying medical gas pipes. Detachable covers provide access to the various compartments while enclosing the raceways.

U.S. Pat. No. 4,646,211 discloses a service outlet wall system having a fluid service outlet which is movable along a linear rail so as to permit placement of the service outlet at different positions along the rail. In the '211 system, the service outlet has to be connected to a flexible hose maintained behind the service outlet wall.

U.S. Pat. No. 4,498,693 discloses a rail system with passageways for conducting fluid therethrough. Couplings provide access to the passageways and also provide means for connecting the passageways together.

U.S. Pat. No. 4,305,430 discloses a module with passageways for conducting fluids therethrough. "V"-shaped grooves along the surface of the module indicate the location of the different passageways. A user taps into the desired passageway by drilling rearwardly into the module at a location indicated by a particular groove.

The prior art systems have many disadvantages. In particular, changing the configuration of any of the prior art systems, i.e., adding or removing a gas service, would require the services of maintenance personnel.

Additionally, each prior art system has a gas coupler or other gas supply means which extends horizontally several inches beyond the surface to which the system is installed. In a hospital room, this poses a potential breakage problem as beds are raised or as equipment is wheeled around.

In systems in which fluid is provided via a manifold arrangement configured with DISS (Diameter Indexed Safety System) check valves, the flow to the couplers is restricted. Systems which use flexible hoses also have inherent restrictions causing reduced flow rates. These reduced flow rates are most problematic in vacuum outlets where high flow rates are desirable.

Systems utilizing gas outlets which are movable along linear rails require a space between the rail and any service access panels. This gap along the entire length of the wall allows for dirt and dust to accumulate behind the panels, an area not subject to routine cleaning. These linear rail systems also employ flexible hoses to supply gases to the movable outlets. Flexible hoses are subject to damage and breakage, and therefore have high maintenance costs associated with them, and also pose a potential health and safety risk from noxious or combustible gases.

SUMMARY OF THE INVENTION

The present invention alleviates to a great extent the deficiencies of the prior art by providing a system for supplying gases at a plurality of locations and for accessing one of the gases at least one of the locations.

In one aspect of the invention, a system is provided for supplying a plurality of different fluids (such as medical fluids) at a plurality of locations (such as locations spaced apart along the length of a hospital room); for connecting a selected fluid to a conduit means (such as a hose adaptor leading to a medical apparatus) at a first location; and for inhibiting access to (such as by covering) another one of the locations.

In one aspect of the invention, a plurality of gases (such as oxygen, medical air and vacuum) are supplied by a multifluid distribution system to groups of check valves which are spaced at fixed locations. The check valves are positioned in the multifluid distribution system such that they are behind the planar surface to which the multifluid distribution system is mounted. The user may access one of the gases at any location by connecting a gas-specific active fascia assembly to the distribution system at that location. To select another fluid at that location, the first active fascia assembly is replaced by a second active fascia assembly designed for the second fluid (and the first fascia assembly may be relocated to supply the first fluid at a second location). The active fascia assemblies can be readily connected to the multifluid distribution system at desired locations, and then repositioned at different locations to accommodate changes in the user's needs. At all times, the unused locations may be covered by blank fascia assemblies.

The present invention allows for gas service customization between patients and permits the medical facility to add, remove or change the mix of various gas services without the limitations and disadvantages of the prior art systems. With the present invention, three or more gases (vacuum included) can be provided. Furthermore, the present invention allows for quick and easy conversion from one gas to the next.

It is an object of the present invention to provide an improved method of supplying fluid which allows the user to readily change the fluid supply arrangement to meet changes in room layout.

It is a further object of the present invention to provide an improved method of supplying fluid where the user may readily change the fluid supplied at a particular location and may also readily change the position at which the fluid is supplied while insuring that other locations are covered.

It is a further object of the present invention to provide a system which allows for the selection of a fluid at a single location, for changing the selected fluid, and for insuring that an incorrect fluid is not accessed.

Another object of the present invention is to facilitate quick repair of medical gas outlets, as faulty active fascia assemblies can be easily exchanged without the need for maintenance personnel. Currently, faulty outlets are taken apart by trained maintenance personnel and repaired with spare parts.

Additional objects and advantages of the invention will be set forth in part in the description which follows, and in part will be obvious from the description, or may be learned by practice of the invention. The objects and advantages of the invention will be obtained by means of instrumentalities and combinations particularly pointed out in the appended claims.

BRIEF DESCRIPTION OF THE DRAWINGS

FIG. 1A is an enlarged view of a portion of the fluid outlet system of FIG. 1;

DETAILED DESCRIPTION OF PREFERRED EMBODIMENTS

Figure 1:
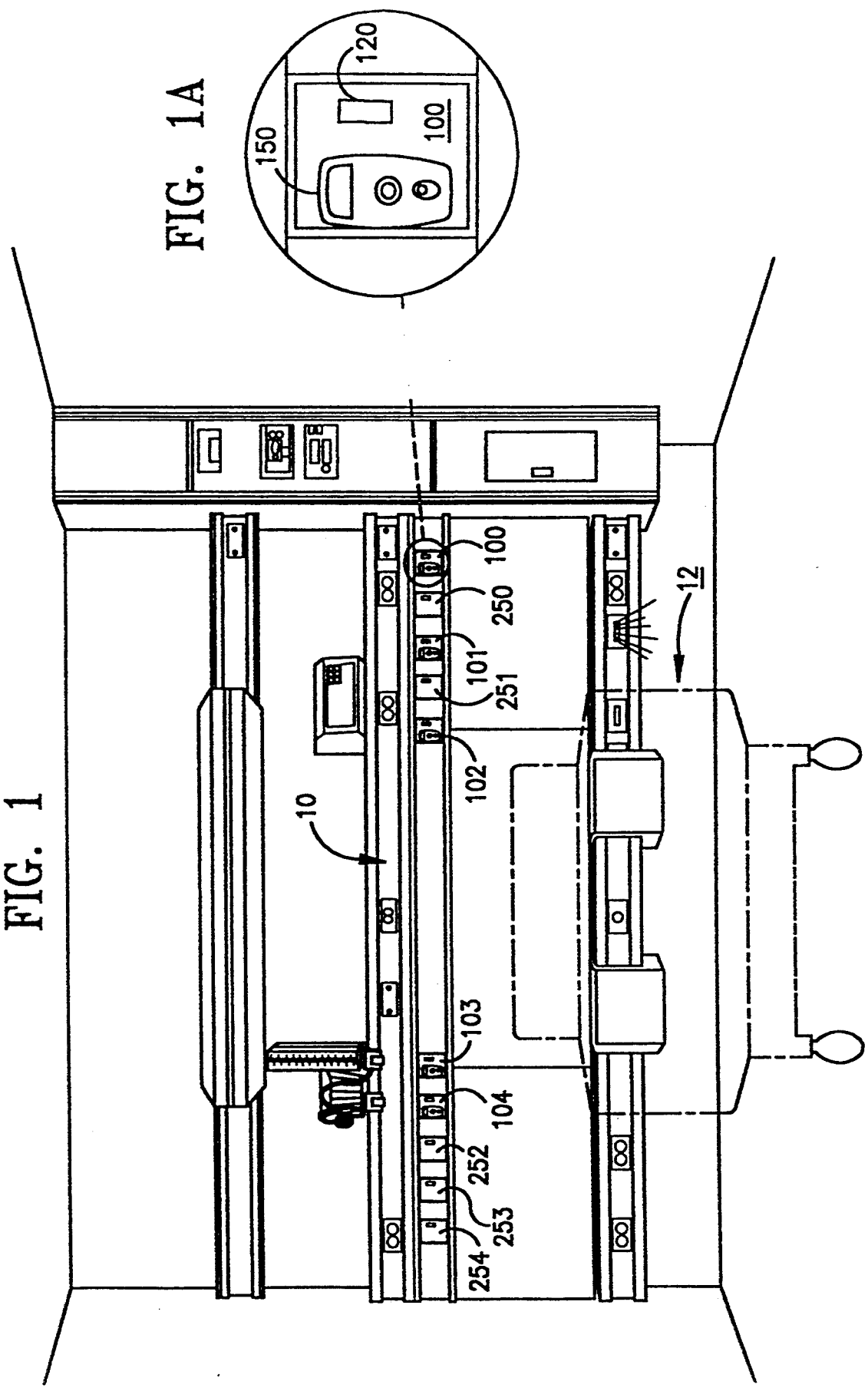
FIG. 1 is a perspective view of a hospital room with a fluid outlet system in accordance with a preferred embodiment of the present invention.

A fluid outlet system 10 in accordance with one preferred embodiment of the present invention is illustrated in FIG. 1. The system 10 includes a multifluid distribution assembly 20 (FIG. 2), a plurality of fluid adaptors 200 (one of which is illustrated in FIG. 2), a plurality of gas-specific active fascia assemblies 100-104 (one of which is illustrated in FIG. 2), and a plurality of blank fascia assemblies 250-254 (one of which is illustrated in FIG. 3).

The multifluid distribution assembly 20 (FIG. 2) is formed of a sheet metal housing (or molding) 22 having a back plate 24, a bottom plate 26, a lower front plate 28, a top plate 30 and an upper front plate 32. The housing 22 may extend the full length of the fluid outlet system 10 and house all of the fascia assemblies 100-104 and 250-254, or there may be a plurality of shorter length housings 22 each sized for only one or more of the fascia assemblies. As illustrated in FIG. 2, the housing 22 is sized to be long enough for a single fascia assembly. A keying hole 34 is formed through the back plate 24. Also, a nut 36 is immovably located in the back plate 24 for engaging a bolt 126 as described in more detail below.

Check valve assemblies 38, 40, 42 are staked to the back plate 24 such that respective fluid outlet conduits 44 project inwardly through corresponding holes in the back plate 24. In the illustrated embodiment, the check valve assemblies 38, 40, 42 are supplied with medical air, oxygen and vacuum, respectively, by fluid supply conduits 46, 48, 50, which extend the full length of the outlet system 10.

Figure 2:
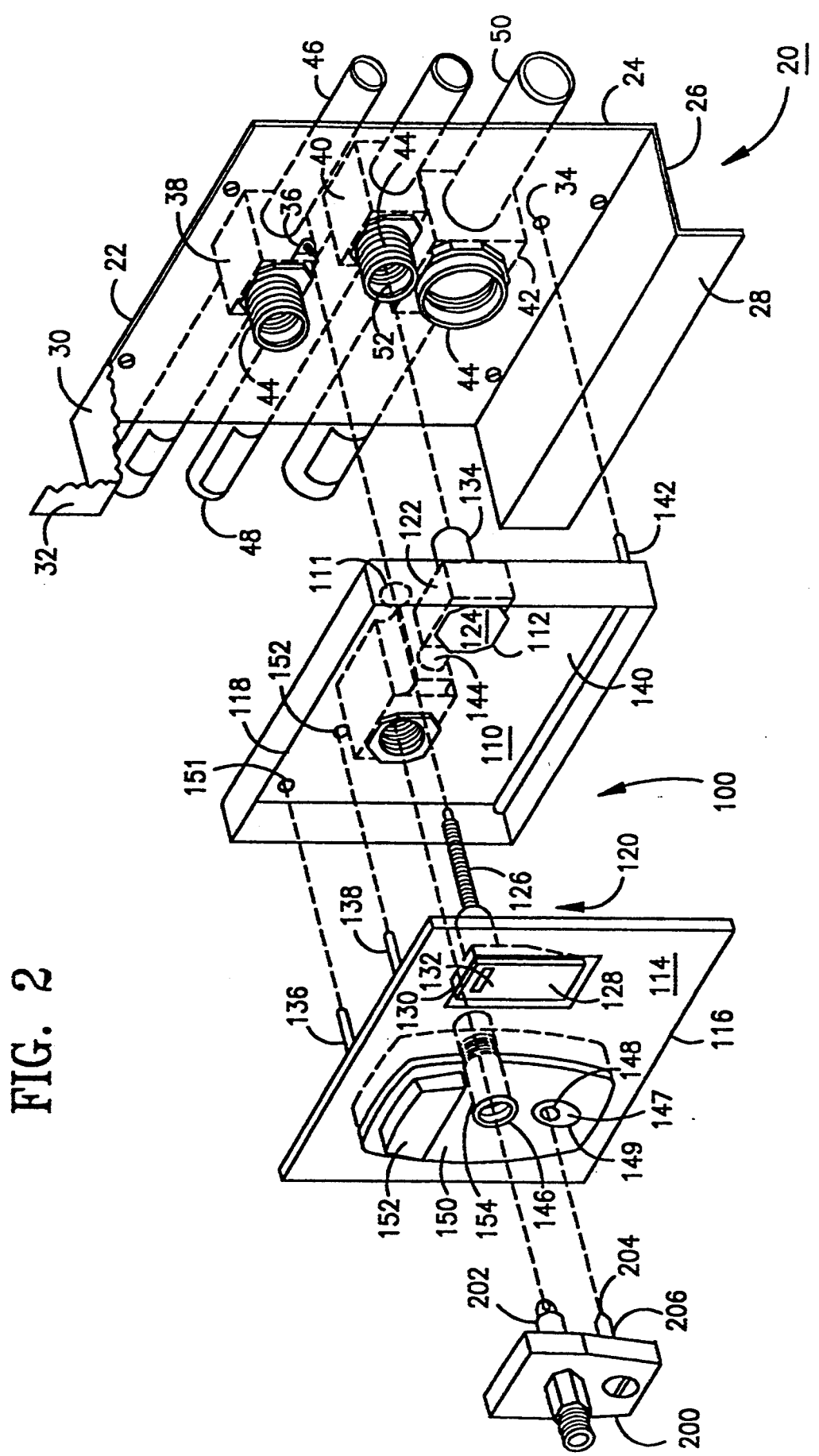
FIG. 2 is a broken-away, exploded, perspective view of a portion of the fluid outlet system of FIG. 1.
Figure 3:
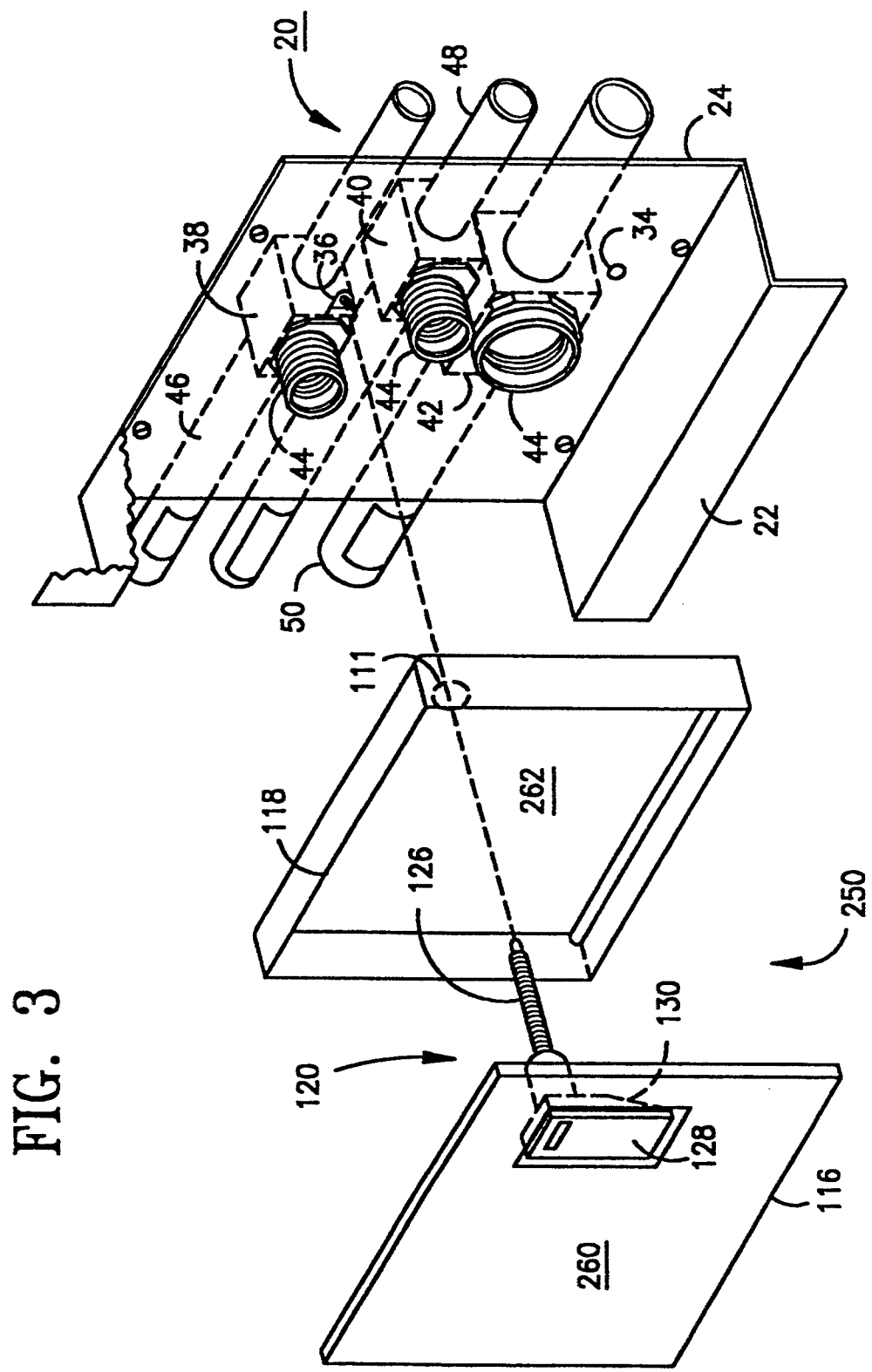
FIG. 3 is a view like FIG. 2 showing a blank fascia assembly.

As illustrated in FIG. 2, the three check valve assemblies 38, 40, 42 are positioned at the assembly 20 as a set or group. Each assembly 20 includes a set of check valve assemblies spaced apart at desired intervals along the length of the fluid outlet system 10. In the embodiment illustrated in FIG. 1, there is an identical set of three check valve assemblies behind each of the active fascia assemblies 100-104 and blank fascia assemblies 250-254.

The active fascia assembly 100 illustrated in FIG. 2 is designed for oxygen. The fluid outlet system 10 includes other active fascia assemblies designed for oxygen, such as active fascia assemblies 101 and 104 (FIG. 1) which are identical to active fascia assembly 100. The system 10 also has active fascia assemblies (such as active fascia assemblies 102 and 103) which are generally like active fascia assembly 100 but which are designed for air and vacuum, respectively.

The active fascia assembly 100 is formed of a rear box-shaped plate 110 having a hole or cutout 112 corresponding in position to the check valve assemblies 40, and a flat face plate 114 with a perimeter 116 which covers the outer edges 118 of the box-shaped plate 110 when the plates 110, 114 of the active fascia assembly 100 are assembled together. The plates 110 and 114 are assembled together prior to use. When the plates are assembled together, a valve 154 is in fluid communication with a conduit 144, a fluid connector body 122, and another conduit 134. The assembly 100 also has a latching mechanism 120 for releasably connecting the active fascia assembly 100 to the nut 36 located in the back plate 24. The fluid connector body 122 is secured to the cutout 112 by a stud 124 which is pressed through the cutout 112.

The latching mechanism 120 is formed of a threaded rod 126 and a handle 128, with the handle 128 being located on the front of the fascia assembly 100. The assembled active fascia assembly 100 is firmly connected to the housing 22 by threading the rod 126 into the fixed nut 36. The rod 126 extends through a hole 111 in the rear plate 110. The rod 126 is rotated by the handle 128. When the handle 128 is not being used, it may be folded into a recessed area 130, such that it is out of the way. When the active fascia assembly 100 is to be removed or replaced, the top portion 132 of the handle 128 is pushed inwardly (toward the back plate 24), causing the handle 128 to pivot out of the recessed area 130. The rod 126 can then be threaded out of the nut 36 by rotating the handle 128. This procedure may then be reversed at a second location to firmly connect the active fascia assembly 100 opposite another valve assembly 40.

A tubular valve member 134 projects rearwardly from the connector body 122. In operation, when the active fascia assembly 100 is connected to the housing 22 (i.e., when the rod 126 is threaded into the nut 36), the valve member 134 extends into an opening 52 of the conduit 44 connected to valve assembly 40. This opens a valve within the check valve assembly 40, and thereby establishes fluid communication between the check valve assembly 40 and the body 122.

In the illustrated embodiment, the valve member 134 is aligned such that it is inserted into the opening 52 when the fascia assembly 100 is connected to the housing 22, such that oxygen from the conduit 48 is supplied to the active fascia assembly 100. The active fascia assemblies 102, 103 for medical air and vacuum are similar to the active fascia assemblies 100 except that the assemblies 102, 103 each have a set-specific fluid connector body 122 positioned so as to be opposite the valve assemblies 38 and 42, respectively, to supply medical air and vacuum, respectively.

As illustrated in FIG. 2, keying pins 136, 138 project rearwardly from the face plate 114 and fit into keying holes 151, 153, respectively, formed into the back wall 140 of the box-shaped plate 110. Pin 136 and hole 151 are located in a position unique for oxygen. None of the face plates and rear plates for other gases have pins or holes in this position. With this gas-specific indexing scheme, only an oxygen type face plate 114 can be assembled to an oxygen type rear plate 110 which has a valve member 134 positioned to mate with the oxygen valve assembly 40. All of the active fascia assemblies that are designed for oxygen (i.e., fascia assemblies 100, 101 and 104) have similarly positioned keying pins 136 and keying holes 151. The active fascia assemblies that are designed for air and vacuum (i.e., the fascia assemblies 102 and 103, respectively) have different indexing schemes, i.e., have keying pins and keying holes in different locations. The object of the indexing schemes is safety. The keying pins and matching keying holes eliminate the possibility of accidently assembling the various face plates 114 for air, oxygen and vacuum to other than the respective rear box-shaped plates 110 with cutouts 112 for air, oxygen and vacuum, respectively.

The present invention is not limited to the use of sets of gases including oxygen, medical air and vacuum. Other fluids, such as for example nitrogen and nitrous oxide, may also be supplied. These fluids may be provided in various sets of combinations (including individually) throughout the extent of the fluid outlet system. For example, a different set of gases could include oxygen, nitrogen and vacuum. Yet another set could include nitrous oxide, medical air, nitrogen and vacuum. Yet another set could include oxygen and nitrogen.

In the illustrated embodiment, the pins 138 and 142 and the holes 153 and 34 are all specific to the set of gas outlets illustrated in FIG. 2, i.e., the set formed of the air, oxygen and vacuum valve assemblies 38, 40 and 42. Other fascia assemblies similar to the fascia assemblies 100-104 can be developed with keying pins and holes which are structurally similar to the pins 138, 142 and holes 153, 34 of the illustrated set-specific fascia assembly 100, but which are located in different positions characteristic of different sets of fluids.

The active fascia assembly 100 has a gas-specific adaptor interface 150 for connecting a corresponding gas-specific adaptor 200 to the respective fascia assembly 100. The interface 150 has a latch button identifier 152 for identifying the gas to be supplied through that adaptor interface 150 and for releasing the adaptor 200 from the adaptor interface 150. When the adaptor 200 is inserted into the interface 150, a valve 154 is opened so as to place the adaptor 200 in fluid communication with the body 122 through a conduit 144. When the adaptor 200 is removed, the valve 154 is closed.

The fluid adaptor 200 is connected to the interface 150 by inserting a tubular valve stem 202 and a notched stem 204 into openings 146, 148. A notch 206 in the stem 204 interacts with a latching mechanism in the adaptor interface 150 to secure the adaptor 200 in place. The opening 148 is located within an insert 147 which fits into an insert space 149.

Preferably, the location of the opening 148 relative to the insert space 149 is keyed to the type of fluid to be handled. In the illustrated example, the insert opening 148 is located toward the top of the insert 147, such that the openings 146, 148 are relatively close together; and the stems 202, 204 are correspondingly close together so as to simultaneously fit into the openings 146, 148. When handling another fluid, e.g. vacuum, the insert opening 148 may be towards the bottom of the insert space 149, such that the spacings between the openings 146, 148 and the corresponding stems 202, 204 are larger. Moreover, the cross section of the insert opening 148 and the stem 204 for each type of fluid may be unique (round, square, triangular, etc.) and keyed to each other. In other words, the stems 202 and 204 preferably are formed with a composite cross section, and the openings 146, 148 are formed with a corresponding composite cross section unique to the type of gas to be handled by the adaptor 200 and interface 150 (oxygen, in the illustrated embodiment). This provides added safety by ensuring that an adaptor will not be connected to the wrong type of interface (e.g., an adaptor for air will not be connected to an interface for oxygen). This is important in ensuring that all medical apparatuses and other fluid receiving means are connected to the proper fluid.

In the illustrated embodiment, the interface 150 and adaptor 200 are formed of a CHEMETRON ® brand connection system. Other commercially available connectors, such as Ohio or Puritan Bennett adaptors or DISS connections may be used in place of the illustrated adaptor interface 150 and adaptor 200.

Each blank fascia assembly 250-254 (FIG. 3) is formed of a blank fascia assembly face plate 260 connected to a mounting plate 262. The size and shape of the blank fascia assemblies 250-254 are similar to the corresponding dimensions of the active fascia assemblies 100-104.

All of the blank and active fascia assemblies are similarly releasably connected to the housing 22. The blank fascia assemblies 250-254 each have a latching mechanism 120 which is identical to the latching mechanisms 120 of the active fascia assemblies 100-104. Thus, the active fascia assemblies 100-104 can be located in front of any of the sets of valve assemblies, as desired, and the remaining sets of valve assemblies can be covered by the blank fascia assemblies 250-254, such that direct access to all elements of the multifluid distribution system 20 can be inhibited, which is important for safety, maintenance and aesthetic reasons.

In practice, the multifluid distribution system 20 is advantageously mounted into a hospital room wall, e.g., along the head of a hospital bed 12, as illustrated in FIG. 1. Advantageously, the top front plate 32 and the bottom front plate 28 of the housing 22 (FIG. 2) are flush with the wall within which the system 10 is mounted. In alternative embodiments, there may be a plurality of multifluid distribution systems spaced at fixed intervals along a wall and/or the distribution system may be installed into a headwall or console mounted in the room wall or ceiling or other surface, or installed directly into the room walls, ceilings, and the like.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is new and desired to be protected by Letters Patent of the United States is:

1. A fluid outlet system, comprising:
   supplying means for supplying a plurality of different fluids at each of plurality of locations;
   accessing means for accessing a first one of said fluids at a first one of said locations; and
   access inhibiting means for inhibiting access to a second one of said locations;
   wherein said supplying means includes: a housing; a plurality of valves located within said housing, said plurality of valves including a valve; for each of said plurality of fluids at each of said plurality of locations; and a multi-fluid distribution system for supplying said plurality of fluids to said plurality of valves; and
   wherein said accessing means includes a first fluid-specific active fascia assembly for opening the valves for said first fluid and for simultaneously covering the valves for the fluids other than said first fluid, and wherein said first fluid-specific active fascia assembly includes a face plate for covering the valves for the fluids other than said first fluid; and wherein said access inhibiting means includes a plurality of blank fascia assemblies which are each releasably connectable to said housing at each of said plurality of locations, each of said blank fascia assemblies including a cover plate for simultaneously covering all of the valves at the respective location.

* * * * *